March 24, 1970   C. W. PHELPS   3,502,432
RECLAMATION OF SPENT HYDROCHLORIC ACID
Filed Sept. 9, 1968
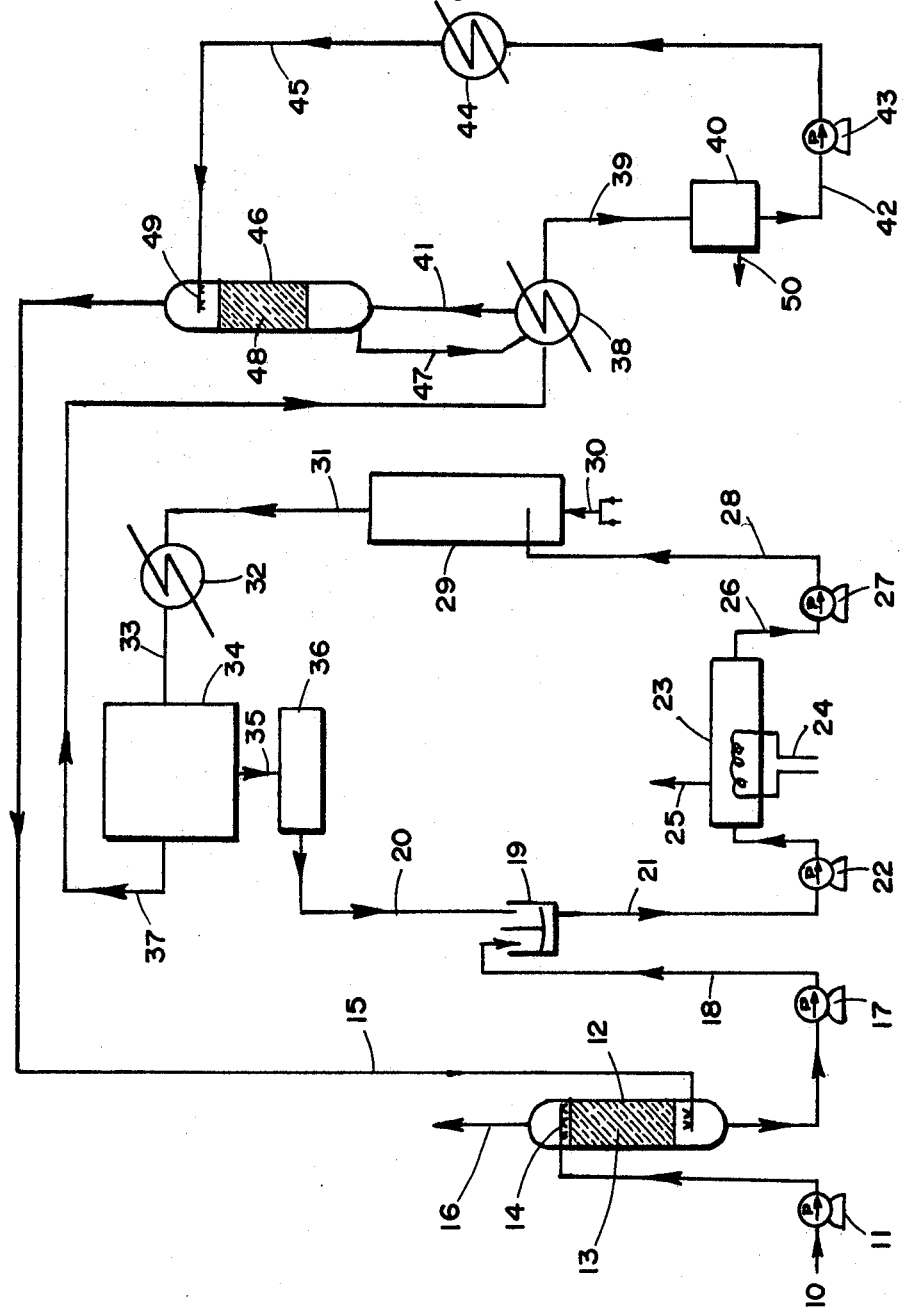
INVENTOR
CARL W. PHELPS
BY
*Salvatore G. Militana,*
*attorney*

United States Patent Office 3,502,432
Patented Mar. 24, 1970

3,502,432
RECLAMATION OF SPENT HYDROCHLORIC
ACID
Carl W. Phelps, Miami, Fla., assignor to Ross Engineering Co., Inc., Miami, Fla., a corporation of Florida
Filed Sept. 9, 1968, Ser. No. 758,490
Int. Cl. C01b 7/08
U.S. Cl. 23—154          2 Claims

ABSTRACT OF THE DISCLOSURE

The process of regenerating spent hydrochloric acid which contains ferrous chloride in aqueous solution with or without hydrochloric acid consisting of the bringing of same into intimate contact in an absorber with gaseous combustion products discharged from a second absorber, forming condensed hydrochloric acid which is then mixed with iron oxide particles to form appropriate chlorides, concentrating the chlorides and percolating combustion products through the chlorides, then cooling the mixture and removing the iron oxide therefrom and mixing hydrochloric acid produced by the second absorber in a heat exchanger to form hydrochloric acid of certain strength, a portion of which is drawn off, cooled and directed to the second absorber and brought into intimate contact with combustion products having hydrogen chloride therein, the hydrochloric acid combining with the hydrogen chloride and being drawn off and discharged into the heat exchanger to form concentrated hydrochloric acid of desired degree.

---

This invention relates to the regeneration of hydrochloric acid and is more particularly directed to the reclamation of spent hydrochloric acid from any aqueous solution of ferrous chloride which may or may not also include hydrochloric acid.

A principal object of the present invention is to provide a process for regenerating spent hydrochloric acid of a desired percentage of concentration so that it may be reused without the need for adding concentrated hydrochloric acid to raise the regenerated hydrochloric acid to the desired concentration.

Another object of the present invention is to provide a process for regenerating spent hydrochloric acid present in an aqueous solution wherein the free hydrochloric acid is first converted to the appropriate chloride and then heated in a concentrator wherein loss of the hydrochloric acid is reduced to a minimum.

A further object of the present invention is to provide a process for regenerating spent hydrochloric acid and producing hydrochloric acid of a desired strength wherein if hydrochloric acid of lesser strength is produced the latter is recycled in the system until hydrochloric acid of desired strength is produced.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing, the figure is a schematic diagram of my process for reclaiming spent hydrochloric acid.

Referring to the schematic drawing illustrating my process for regenerating spent hydrochloric acid from any aqueous solution of ferrous chloride which may or may not also contain hydrochloric acid, the solution enters the system through 10 by pump 11 which directs the solution to a scrubber 12 that contains packing 13. The aqueous solution being regenerated is distributed within the scrubber 12 as by sprayers 14. The packing 13 causes the aqueous solution to come into intimate contact with certain combustion products including nitrogen, carbon dioxide, air and traces of hydrogen chloride which gases are drawn from an absorber 46 through line 15 and whose function is explained in detail hereinafter.

The scrubber 12 causes the aqueous solution to absorb all of the hydrogen chloride and the remaining combustion products are permitted to escape to the atmosphere through line 16.

Pump 17 now pumps the aqueous solution through line 18 to an agitator tank 19 where it is mixed with iron oxide particles produced and recycled in this process from a storage or holding tank 36. The iron oxide combines with the hydrochloric acid that is present in the aqueous solution within the agitator tank 19 to form its appropriate chlorides, ferrous and/or ferric chloride.

The resulting aqueous solution is fed out of the tank 19 through line 21 by pump 22 to a concentrator 23, where a heating coil 24 by indirect heating heats the aqueous solution. Water vapor produced therein is dissipated into the atmosphere through line 25 and the remaining concentrated ferrous and/or ferric chloride solution is drawn off by a pump 27 through line 26 and directed to a discharge line 28 where it is pumped to a superheater 29. By direct heating by use of a gas flame heater 30, the combustion products are permitted to percolate through the concentrated chloride solution to form gaseous hydrogen chloride, iron oxide, water vapor, air and combustion products, all of which are discharged through line 31 into a heat exchanger 32 where this mixture of gas and solids is cooled. Line 33 discharges the aforesaid superheated mixture into an electrostatic precipitator 34 wherein the iron oxide particles are separated and discharged through line 35 and deposited in a holding tank 36. As needed the iron oxide collected in the holding tank 36 is discharged through line 20 into the agitator tank 19 as needed for recycling in the system as explained hereinabove.

The remaining gaseous mixture in the electrostatic precipitator 34 consisting of gaseous hydrogen chloride, water, vapor, air and combustion products is discharged through line 37 to a heat exchanger 38 where the solution is cooled and mixed with hydrochloric acid produced by an absorber 46 as explained hereinafter and discharged therefrom through a line 47 to the heat exchanger 38. Condensed hydrochloric acid produced by the heat exchanger 38 is discharged through the line 39 to a storage tank 40, while the air, combustion products and hydrogen chloride gases are led from the heat exchanger 38 through the line 41 to the absorber 46 for regenerating more hydrochloric acid.

The hydrochloric acid stored in the tank 40 is drawn off for use through line 50 if it is up to the proper concentration. If not of desired concentration, pump 43 pumps the weak hydrochloric acid through line 42 to a heat exchanger 44 where it is cooled and discharged through line 45. The cooled hydrochloric acid is received by and distributed in the absorber 46, which is similar in construction with that of the absorber 12. The absorber 46 brings the cooled weak hydrochloric acid which is sprayed as at 49 onto packing 48 and percolates therethrough coming into intimate contact with combustion products, air and hydrogen chloride entering the absorber 46 through line 41. The hydrogen chloride is absorbed by the weak hydrochloric acid and discharged through the line 47 to the heat exchanger 38 where as aforesaid, the hydrochloric acid is concentrated and brought up to the desired percentage of concentration.

By controlling the amount of heat supplied by the indirect heater 24 at the concentrator 23, the desired strength of the hydrochloric acid is produced by my process since water vapor formed in the concentrator is expelled to the atmosphere through the line 25. If a higher concentration of hydrochloric acid is to be produced, a greater amount of heat is applied at 24 and a larger volume of water vapor is expelled from the system through the line 25.

What I claim as new and desire to secure by Letters Patent of the United States is:

1. A process of regenerating spent hydrochloric acid consisting of an aqueous solution of ferrous chloride comprising the steps of:
   (a) passing the aqueous solution of ferrous chloride through a first absorber into intimate contact with gaseous combustion products, which products containing traces of hydrogen chloride have been produced in a second absorber, whereby the hydrogen chloride is absorbed by said solution containing ferrous chloride,
   (b) passing the aqueous solution thus produced to an agitator tank,
   (c) mixing said solution containing ferrous chloride with iron oxide particles drawn from a storage tank forming thereby ferrous and/or ferric chloride with the hydrogen chloride present in the aqueous solution,
   (d) concentrating said solution thus produced by indirect heating and directing the concentrated solution of ferrous and/or ferric chloride to a superheater, wherein and upon heating said concentrated solution with direct gas flame the resultant products percolate through the concentrated solution to form a mixture comprising gaseous hydrogen chloride, iron oxide, water vapor, air and combustion products,
   (e) cooling the mixture,
   (f) separating said iron oxide from said mixture by electrostatic means and storing said iron oxide in said storage tank,
   (g) cooling the remainder of said mixture consisting of gaseous hydrogen chloride, water vapor, air and combustion products and simultaneously mixing same with hydrochloric acid, produced in a second absorber,
   (h) withdrawing the hydrochloric acid solution produced containing absorber hydrogen chloride to a second storage tank and directing the remainder of said gaseous mixture to said second absorber,
   (i) withdrawing a portion of said hydrochloric acid from said second storage tank, cooling same, and thereafter directing same to the second absorber for intimate contacting with the aforementioned remainder of said gaseous mixture containing combustion products, air and hydrogen chloride to cause the said hydrogen chloride to be absorbed by said hydrochloric acid to increase the strength thereof to desired degree, and thereafter discharging same to said second storage tank.

2. The process as recited by claim 1 wherein said aqueous solution of ferrous chloride contains hydrochloric acid.

References Cited

UNITED STATES PATENTS

| | | | |
|---|---|---|---|
| 2,428,221 | 9/1947 | Hudson | 23—154 XR |
| 2,950,180 | 8/1960 | Kunzer et al. | 23—154 XR |
| 3,310,435 | 3/1967 | Robinson et al. | 23—154 XR |
| 3,399,964 | 9/1968 | Michels et al. | 23—154 |
| 3,440,009 | 4/1969 | Flood et al. | 23—154 |
| 3,442,608 | 5/1969 | Addinall et al. | 23—154 |
| 3,443,991 | 5/1969 | Kremm | 23—154 XR |

EDWARD STERN, Primary Examiner

U.S. Cl. X.R.

23—87, 200